Aug. 26, 1969  E. S. BLAKE ET AL  3,463,802

TETRAKIS PERFLUORO-ALKYL ORTHOSILICATES

Filed July 28, 1964

INVENTORS:
EDWARD S. BLAKE
JAMES A. WEBSTER
BY Mary B. Moshier
ATTORNEY 3,463,802
TETRAKIS PERFLUORO-ALKYL
ORTHOSILICATES
Edward S. Blake and James A. Webster, Dayton, Ohio, assignors to Monsanto Research Corporation, St. Louis, Mo., a corporation of Delaware
Filed July 28, 1964, Ser. No. 385,647
Int. Cl. C07f 7/04; C10m 3/46
U.S. Cl. 260—448.8    5 Claims

ABSTRACT OF THE DISCLOSURE

Organic silicates containing partially fluorinated alkoxy groups of the formula $Si[O(CH_2)_m(CF_2)_nCF_3]_4$ wherein $m$ is a number of 3 to 11 and $n$ is a number of 0 to 6, useful as hydraulic fluids.

---

Figure 1:
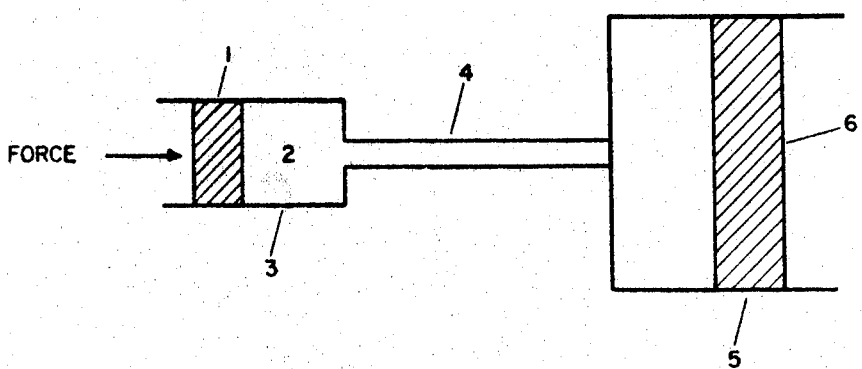

This invention relates to organic silicon compounds and more particularly provides certain new and valuable, highly fluorinated organic silicates and methods of preparing the same, which methods involve utilization of certain hitherto unknown highly fluorinated alkanols that are also presently provided. The invention also relates to functional fluid compositions comprising the new silicates and methods of actuating a power-transmitting device wherein said compositions are employed.

The operation of hydraulic mechanisms generally requires a combination of properties which most liquids do not possess. This is particularly true when the hydraulic system is designed for use in widely differing environments. The hydraulic fluid must often remain liquid over wide temperature ranges, e.g. at temperatures which may be below, say, freezing, and above, say 400° F. In many applications, the flame-resistance of the fluid is of great concern; and, of course, the fluid should not ignite spontaneously at the operating temperatures. In numerous applications, it is important that the hydraulic fluid resist attack by water and/or oxygen and that it be non-corrosive to the mechanical components with which it may come into contact.

The many rigorous requirements have resulted in the provision of numerous specialty compositions whereby, much as in the lubricant and motor fuel arts, additives of various kinds have been admixed with the base fluid for the purpose of imparting to it one or more of the properties in which the base stock is deficient. However, properties such as thermal stability and resistance to hydrolysis generally cannot be conferred to a fluid by the use of an additive; and although fire-retardant additives for fluids are known, often such additives are of little value when used with fluids that are hydrolytically and thermally unstable.

Numerous organic silicates are known to the art, many of these have been suggested for use as functional fluids, and halogenated tetraalkyl silicates have been investigated as possibly having improved thermal stability owing to the presence of halogen. Silicates, however, are generally susceptible to moisture. Resistance to hydrolysis usually decreases as the temperature to which the silicates are exposed is increased. This is a major drawback, because the great interest in silicon-containing functional fluids is in fields where the fluids are destined to be used at high temperatures. Thus, although the substitution of fluorine in the silicate molecule was made with the expectation of increasing thermal stability, the fluids could not be used at the higher temperatures under circumstances where they would come into contact with moisture because of increased hydrolysis at the higher temperatures. According to C. Popoff and R. K. Smith in the U.S. Air Force Report ASTD TR 61–405, part I, at page 7, the hydrolytic stability of $\alpha,\alpha,\omega$-trihydrofluoroalkyl silicates is considerably poorer than observed with conventional alkyl silicate fluids. Thus, these investigators report that tetrakis(1,1,7-trihydroperfluoroheptyl) silicate hydrolyzed to 90% based on recovered silica when mixed with water for 8 hours at 50° C. Hydrolysis is evidenced by a change in viscosity of the fluid. For example, O. R. Pierce and E. T. McBee state in the U.S. Air Force Report WADC TR 53–79, at pages 51–52, a 40.35% viscosity change as a result of a hydrolytic stability test on tetrakis(1,1-dihydroperfluorobutyl) silicate.

We have found surprisingly, that all fluorinated tetraalkyl silicates do not possess the hydrolytic instability of the previously known members of this class. The present invention thus provides new silicates which possess substantially the high thermal stability of prior fluorine containing organic silicates but which are not appreciably deteriorated when subjected to high temperatures in the presence of moisture. According to the invention, the new silicates are readily prepared by reaction of a silicon tetrahalide with the appropriate fluorinated alkanol, substantially according to the scheme

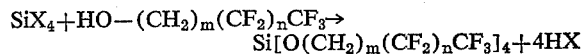

wherein X is halogen having an atomic weight of above 35, $m$ is a number of 3 to 11, and $n$ is a number of 0 to 6.

The presently useful silicon tetrahalides include silicon tetraiodide, silicon tetrabromide, silicon tetrachloride, dibromodichlorosilane, etc.

The useful alkanols are (perfluoroalkyl)alkanols containing at least three unsubstituted methylene groups in a chain which bridges the hydroxy-bearing carbon atom with a perfluorinated alkyl radical. Hereinafter, whenever the alkanols are preponderately fluorinated, there will be used the convenient "hydro" terminology employed in the art to show hydrogen instead of fluorine in certain carbon atoms of an otherwise perfluoro compound. Thus, the compound of the formula

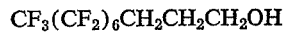

i.e., 1,1,2,2,3,3-hexahydroperfluorodecanol is reacted with, say, silicon tetrabromide or silicon tetrachloride to give the presently provided tetrakis(1,1,2,2,3,3-hexahydroperfluorodecyl) silicate of the formula:

The less highly fluorinated alkanol of the formula

i.e., 4,4,4-trifluorobutanol, reacts with, say, silicon tetrachloride or silicon tetraiodide to give tetrakis(4,4,4-trifluorobutyl) silicate of the formula

As will be shown hereinafter the presently provided compounds are characterized by great stability to hydrolysis, as compared to previously known fluorine-containing silicates.

The probable reason for the improved hydrolytic stability of our present silicates is the lessened inductive effect of the electronegative fluorines through the three or more methylene groups between the perfluoro group and the silicon-attached oxygen.

The presently provided fluorinated alkyl silicates must have at least the terminal carbon atom of the alkyl chain completely fluorinated and whatever fluorine-bearing carbon is present must be at least 3 carbon atoms removed from the oxygen which links the fluoroalkyl portion of the molecule to silicon. Such silicates are provided by this invention, and some examples thereof are shown in the table below.

$$Si[O(CH_2)_m(CF_2)_nCF_3]_4$$

| m= | n= |
|---|---|
| 3 | 0 |
| 3 | 4 |
| 3 | 2 |
| 3 | 3 |
| 3 | 6 |
| 4 | 1 |
| 4 | 0 |
| 5 | 3 |
| 5 | 5 |
| 6 | 1 |
| 6 | 4 |
| 7 | 0 |
| 7 | 6 |
| 8 | 1 |
| 8 | 3 |
| 9 | 5 |
| 9 | 2 |
| 10 | 0 |
| 10 | 4 |
| 11 | 3 |
| 11 | 6 |

The alcohols from which the silicates are prepared are obtained, starting from an appropriate ester of an alkenol having a terminal olefinic double bond, by reacting the ester with a perfluoroalkyl halide in the presence of a free-radical liberating agent as catalyst to obtain, as 1:1 addition product, an ester of a haloalkanecarboxylic acid, reducing the latter to get the ester free of iodine, bromine or chlorine, and then hydrolyzing the ester to obtain the presently useful alcohol. The following illustrates the reaction scheme wherein $x$ is a number of from 1 to 9, $R_f$ is a perfluoroalkyl radical of from 1 to 7 carbon atoms and Y is a lower alkyl radical, say, of from 1 to 6 carbon atoms:

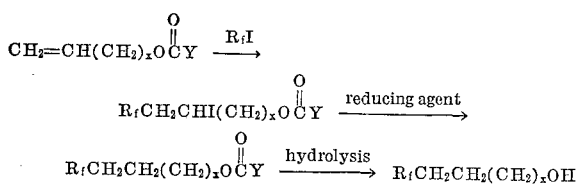

As examples of the suitable starting alkenol esters may be mentioned the esters of an alkanecarboxylic acid such as acetic, propionic or valeric acid with an alkenol such as allyl alcohol, 3-buten-1-ol, 4-penten-1-ol, 5-hexen-1-ol, 6-hepten-1-ol, 10-undecen-1-ol, etc. Examples of perfluoroalkyl halides ($R_fI$ in the above reaction scheme) include perfluoromethyl, perfluoroethyl, perfluoropropyl, perfluorobutyl, perfluoropentyl, perfluorohexyl and perfluoroheptyl iodide, bromide or chloride. The iodide is preferred inasmuch as the carbon-halogen bond strength increases in the order I<Br<Cl.

The free radical liberating agents which may be employed in promoting the addition of the perfluoroalkyl halide to the olefinic ester are compounds which will decompose to give free radicals. Such compounds include peroxygen-type catalysts, for example, acyl peroxides such as acetyl, benzoyl, lauroyl or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; azobis(alkanenitriles); hydrazine derivatives such as hydrazine hydrochloride and dibenzoyl hydrazine; organometallic compounds such as tetraethyl lead, etc. For convenience, the peroxygen-type catalysts will be hereinafter referred to as peroxidic compounds. Only catalytic quantities of the free-radical-liberating agent need be employed in promoting the addition reaction. Quantities of as little as 0.001 percent to 1.0 percent, based on the weight of the ester, are generally sufficient to give optimum yields. Ultra-violet light may be employed with the catalyst or as the sole catalytic agent. In many instances, thermal activation is sufficient.

Reaction of the perfluoroalkyl halide with the alkenol ester in the presence of the free-radical liberating agent occurs readily at ordinary or moderately increased temperatures and in the presence of an inert diluent or solvent, e.g., benzene or ether. Usually, temperatures of from, say, 20° C. to refluxing may be used.

Reduction of the 1:1 addition product, i.e., the haloalkanecarboxylate to remove the iodine, bromine or chlorine may be effected by contacting the ester with a reducing agent, e.g., a metal hydride such as lithium aluminum hydride or a reducing metal such as Raney nickel. An inert organic diluent, e.g., benzene, hexane, ether or a lower alkanol may be used as diluent. Depending upon the nature of the reducing agent, heating and/or the use of super-atmospheric pressure may or may not be required. Use of Raney nickel at ambient temperature, e.g., at from 15–30° C. and under superatmospheric pressure, say, at a pressure of from 300 to 1500 p.s.i., is preferred.

Hydrolysis of the alkanecarboxylate presents no problems, conversion of the ester to the alcohol being conducted simply by contacting the ester with water in the presence of an acidic or alkaline catalyst of hydrolysis, e.g., a mineral acid such as hydrochloric acid or an alkali metal hydroxide or carbonate such as potassium hydroxide or carbonate at ordinary or increased temperature and in the presence or absence of an organic diluent or solvent until hydrolysis is substantially complete.

An alternate way of obtaining one class of fluorinated alkanols for use in preparing tetrakis(polyfluoroalkyl) silicates wherein there is a chain of 3 methylene units bridging the perfluorinated alkyl portion with the oxygen link, is to start with a 1,1,2,2-tetrahydroperfluoroalkyl halide, convert the halide to a Grignard reagent, treat the latter with carbon dioxide to give a carboxylic acid and then finally reduce the acid to the alcohol, thus:

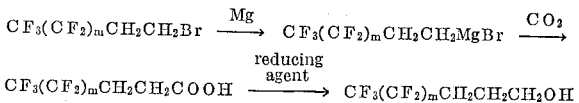

wherein $m$ is a number of 0 to 6.

In the above series of reactions, the Grignard reagent is formed readily by adding an ether solution of the halide to magnesium in ether. The subsequent reaction with carbon dioxide is effected by simply adding the resulting ether solution of Grignard reagent to excess solid carbon dioxide and allowing the reaction mixture to come to room temperature and then recovering the acid. The acid is reduced, advantageously in ether solution, to the alcohol by treatment with a reducing agent such as lithium aluminum hydride. The entire series of reactions except for the reaction with Dry Ice can generally be conducted at ambient temperatures and pressures.

Conversion of the hydroperfluoroalkanol to the silicate is effected by contacting it with a silicon tetrahalide, advantageously in the presence of an inert organic liquid diluent or solvent. External heating is usually not needed. However, to assure complete reaction, moderate heating may be employed. Ether is a convenient solvent, and in practice, warming the reaction mixture to the refluxing temperature of this solvent gives optimum yields within short periods of time. Since the silicates are formed by participation of one mole of the silicon tetrahalide with 4 moles of the appropriate alcohol, advantageously these reactants are employed in stoichiometric proportions although a slight excess of either reactant may be used. The silicate is recovered from the reaction mixture by usual isolating procedures, e.g., distillation, solvent extraction, etc. The by-product of the reaction is hydrogen halide, and for obtaining good yields of the silicate, means may be provided for removing it from the reaction zone as it is formed. This may be done by using vigorous stirring and dephlegmation and/or working in the presence of hydrogen halide scavenger, e.g., an organic base such as pyridine, triethylamine, etc. Useful solvents for the reaction are, e.g., ether, carbon tetrachloride, benzene, hexane, etc.

For some purposes it may be desired to prepare unsymmetrical esters, i.e., silicates in which all four of the alcohol moieties are not the same. In that case, the silicon tetrachloride is first contacted with less than the stoichiometric quantity of the appropriate alcohol to obtain a partial ester, and esterification is completed by contacting the latter with one or more of the presently useful alcohols. Alternatively, mixtures of alcohols may be employed.

Figure 2:
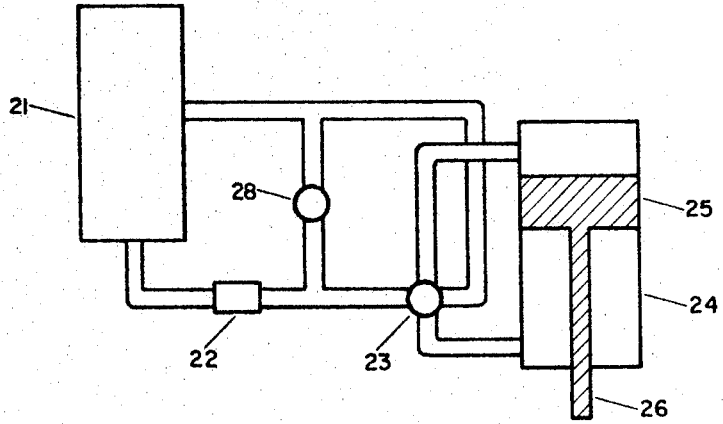

Owing to the excellent physical properties of the present fluorine containing silicates, the invention provides improved hydraulic systems wherein said silicates are employed as the operative fluids. Such systems comprise a displaceable member and a displacing force which is transmitted to said member by means of said fluid, as shown in the schematic diagram of FIGURE 1 of the drawings. Here, a displacing force is applied to piston 1 and transmitted through the fluid 2 contained in cylinder 3 whence it travels through line 4 into cylinder 5 where it acts on the displaceable member 6. In such a system, actuation of a moveable member by the presently provided fluid gives performance characteristics which are outstanding because of the physical properties of the fluid. While hydraulic systems will contain such elements as pumps, valves, cylinders and pistons, the efficacy of the system necessarily depends upon the fluid, since the fluid must be one which can withstand pressure and remain liquid under the conditions of use. FIGURE 2 of the drawings is a schematic diagram which well illustrates the indispensable role of the fluid in cooperation with other components of a hydraulic system. Here the fluid is stored in reservoir 21, and is pumped therefrom by means of pump 22 and through the directional control valve 23 into either end of cylinder 24, where it acts on piston 25 connected by shaft 26 to a motor (not shown) or other device which converts the hydraulic pressure applied to piston 25 into mechanical energy. Action of the fluid on piston 25 displaces the piston until it reaches the end of its travel. The piston may be caused to travel in either direction by adjustment of the directional valve 23. Valve 23 provides for return of the fluid from the opposite side of the piston, back to reservoir 21. Relief valve 28 is provided to maintain a constant hydraulic pressure within the system. When a predetermined pressure is reached, the fluid will flow back to reservoir 21 by functioning of said relief valve.

The low pour points of the fluids permit fabrication of pressure devices which are destined for use in extremely cold climates, and their very good vapor pressure characteristics and stability to heat allows use of the same devices in hot environments. The viscosity characteristics and ASTM slopes of the fluids make them of great utility for the transmission of power in a hydraulic system having a pump therein which supplies power for the system, e.g., in a fluid motor comprising a constant-or variable-discharge piston pump which is caused to rotate by the pressure of the hydraulic fluid of the system. The present fluid likewise serves to lubricate the frictional, moving parts of such hydraulic systems.

For use in a conventional automatic transmission, the presently provided silicate fluid is contained in the outer casing of the transmission device, which casing is attached to the usual engine crankshaft and flywheel and rotates therewith. Within the fluid is a coupling comprising an impeller connected to said casing and a turbine which is connected to the drive shaft of the vehicle. The turbine is driven by the motion of the fluid in response to the rotation of the impeller, as the casing to which the impeller is attached is actuated by the crankshaft and flywheel.

The presently described silicates are particularly suited for use as the operative fluids in hydraulic braking devices owing to their very good vapor pressure characteristics. Under current, severe operating conditions heat build-up within the brake system is frequently encountered. Unless the fluid remains liquid at the high temperatures thus developed, the hydraulic brake system becomes inoperable since the vaporized fluid becomes compressible. Although much effort has been expended at providing high boiling hydraulic brake fluids, generally materials which are high boiling congeal at low temperatures.

The partially fluorinated silicates of this invention have boiling points which are well over 400° F. and some of them do not boil until over 700° F. Hence hydraulic brake systems in which these fluids are used withstand the dangers ensuing from heat build-up. At the same time, owing to the low pour points of the fluids, the system is one which is operable in very cold environment. The present invention thus provides an improved method for applying pressure to a hydraulic brake through a fluid.

The silicates of this invention are also useful as the hydraulic fluids of hydraulic machinery, generally, e.g., inlifts, hoists, jacks, lock-gates, presses, etc.

Evaluation of the hydraulic fluid efficacy of the present silicates was conducted by determining such characteristics as pour point, kinematic viscosity, ASTM slope, autogenous ignition temperature and behavior upon sudden exposure to very high temperatures. The following procedures were used to obtain the data given in the following examples.

The pour point was determined by American Society for Testing Materials (hereinafter referred to as ASTM) procedure D 97–57.

Kinematic viscosity was determined by ASTM D 445–T 1960 procedure, using ASTM kinematic viscosity thermometers which had been calibrated against National Bureau of Standards resistance thermometers.

ASTM slope was determined from the curve plotted from viscosity data on ASTM viscosity-temperature chart D 341 over the temperature range 100° F. to 210° F.

The flash point was determined by ASTM D 92–57 procedure.

The autogenous ignition temperature was determined by ASTM D–60T procedure.

Vapor pressure and thermal stability measurements were conducted by employing substantially the method described by E. S. Blake et al., J. Chem. Eng. Data, 6, 87 (1961), using the isoteniscope, constant temperature bath and vacuum handling system.

The present invention is further illustrated by, but not limited to, the following examples.

Example 1

To a mixture consisting of 200 g. (0.675 mole) of perfluoropropyl iodide and 70 g. (0.70 mole) of allyl acetate there was gradually added a total of 4.4 g. of a catalyst solution prepared by dissolving 0.4 g. of 2,2′-azobis(2-methylpropionitrile) in 4 g. of benzene, addition of said solution being initiated by dropping 0.3 g. of the solution to the mixture at 28° C., and then, when the mixture had begun to reflux (63° C., 35 minutes later) continuing addition of the catalyst solution in six portions over a period of about 48 hours at a temperature of from 63° C. to 70° C. When the last portion of the catalyst solution had been added no refluxing was noted. A fresh catalyst solution was then prepared by dissolving 0.5 g. of the catalyst in 5 ml. of benzene and 1.3 g. of this solution was added to the reaction mixture in two portions during the subsequent 24 hours. Distillation of the resulting product gave 156 g. of the substantially pure 4,4,5,5,6,6,6-heptafluoro-2-iodohexyl acetate, B.P. 80° C./ 5 mm., $n_D^{25}$ 1.4051.

It was reduced to the iodine-free ester as follows: A mixture consisting of 183.4 g. (0.465 mole) of the 4,4,5,5,6,6,6-heptafluoro-2-iodohexyl acetate, 50 g. (0.47 mole) of sodium carbonate, 250 ml. of methanol and 45 g. of Raney nickel was pressured with hydrogen in a 1 liter bomb to 700 p.s.i. and rocked for 2 hours at 20° C. Pressure was then released to expel any carbon dioxide that may have been formed, the bomb was repressured to 700 p.s.i. and rocking was continued for a total reaction time of 24 hours. The reaction mixture was subsequently filtered, the filtrate was diluted with water, and the resulting mixture was allowed to stand for stratification. After washing the separated aqueous phase with ether and the organic phase with water, the ether solutions were combined and dried, first over sodium chloride and then over sodium sulfate. Distillation of the dried product gave the substantially pure 1,1,2,2,3,3-hexahydroperfluorohexyl acetate, B.P. 95–100° C./100 mm.

It was hydrolyzed to the alcohol as follows: 90.9 g. of the heptafluorohexyl acetate was dissolved in 100 ml. of methanol and stirred at room temperature for a few hours while gradually adding to the stirred mixture a solution of 14 g. of sodium hydroxide in 50 ml. of water. The whole was then refluxed for about 2 hours. Upon subsequent standing the reaction mixture separated into a lower organic layer and a top aqueous layer. The organic layer was removed, washed with water, and the washings combined with said top aqueous layer. After diluting the combined material with a saturated sodium chloride solution, it was extracted three times with ether. The ether extracts were added to the washed organic layer, and the resulting material was dried first with sodium sulfate and then with magnesium sulfate. Twice repeated distillation of the dried product gave the substantialy pure 1,1,2,2,3,3-hexahydroperfluorohexanol, B.P. 94° C./100 mm., $n_D^{25}$ 1.3268.

It was converted into the silicate as follows: To 23.4 g. (0.1375 mole) of tetrachlorosilane in ether solution there was slowly added, with ice cooling, 44.3 g. (0.56 mole) of dry pyridine dissolved in 200 ml. of ether. A solution of 125.5 g. (0.55 mole) of the heptafluorohexanol in 200 ml. of ether was then added while maintaining the temperature of the reaction mixture at 10° C. The whole was refluxed at 40° C. for 4 hours and then allowed to stand overnight. About half of the ether was stripped off at 40° C. and the residue was poured into ice-cooled water and extracted with ether. After drying the ether extract, first with sodium sulfate and then with magnesium sulfate, ether was stripped from the dried material and the residue was distilled to give 99.8 g. of the substantially pure tetrakis(1,1,2,2,3,3-hexahydroperfluorohexyl) silicate, B.P. 135–40/0.2 mm. $n_D^{25}$ 1.3327, $D_4^{25}$ 1.495.

The silicate was found to have a pour point of minus 80° F. (supercooled). It had a kinematic viscosity of 5.780 centistokes at 100° F. and 1.688 centistokes at 210° F. Temperature for vapor pressure equal to certain pressures of mercury were determined to be as follows:

| Temp. °C.: | Pressure, mm. Hg |
|---|---|
| 178 | 10 |
| 243 | 100 |
| 308 | 600 |
| 318 | 760 |

The hydrolytic stability of the tetrakis(1,1,2,2,3,3-hexahydroperfluorohexyl) silicate was evaluated by heating it with 4% of its weight of water (2.16 moles of water per mole of the silicate) in a sealed tube for 20 hours at 400° F. and then determining any change in viscosity. Before the heating, the sample with its water-content had a kinematic viscosity of 5.71 centistokes at 100° F. After the heating, the viscosity was found to be 5.66 centistokes. This shows substantially no change in viscosity as a result of the test. On the other hand, as reported by C. Popoff and R. K. Smith in the U.S. Air Force report ASD TR 61–405, Part 1 (pages 17, 29 and 50) when the prior art tetrakis(1,1,7-trihydroperfluoroheptil) silicate having a kinematic viscosity of 24.67 centistokes at 100° F. is heated with 2 moles of water under much less stringent conditions, i.e., for 2 hours at 212° F., the viscosity of this silicate after the test is approximately 2051 centistokes at 100° F. With four moles of water the same silicate gives a gel after 2 hours at 212° F. The very small change in viscosity of the presently provided silicate under the more severe conditions shows remarkable stability as compared to other highly fluorinated alkyl silicates.

Example 2

A Grignard reagent was prepared by adding a solution of 152 g. of 1,1,2,2-tetrahydroperfluorononyl iodide dissolved in 200 ml. of dry ether over a 2.5 hour period to a mixture of ether and 9 g. of magnesium which had been activated by a few drops of ethyl iodide and a minute crystal of iodine. During the addition, the temperature of the reaction mixture was maintained at 30° C. When all of the iodide had been added the whole was refluxed (37° C.) for 2 hours, with stirring.

The Grignard solution thus obtained was added dropwise to a slurry of crushed Dry Ice (carbon dioxide source) in ether and the resulting mixture was stirred for 0.5 hour and then allowed to warm to room temperature overnight. Dilute sulfuric acid was then added to acidify the aqueous solution and the product was extracted with additional ether. After drying over sodium sulfate it was distilled to give the substantially pure 2,2,3,3-tetrahydroperfluorodecanoic acid, B.P. 144–170° C./130–158 mm., M.P. 67–72° C.

The acid was reduced to the alcohol as follows: A molar equivalent of the acid in ether solution was added dropwise to a molar equivalent of lithium aluminum hydride in ether while holding the temperature of the reaction mixture at 30° C. It was then stirred at room temperature for 2 hours, and a small amount of water was added to remove any unreacted hydride. After decanting, the aqueous phase was washed with ether and the combined ether washings and organic phase were distilled to give the substantially pure 1,1,2,2,3,3-hexahydroperfluorodecanol, B.P. 98° C./12 mm.

It was converted into the silicate as follows: A solution of 85.9 g. (0.20 mole) of the hexahydroperfluorodecanol in a sufficient quantity of a mixture of dry benzene and dry ether to give a homogenous solution was added over a 0.5 hour period to a solution of 8.5 g. (0.05 mole) freshly distilled silicon tetrachloride and 16 g. (0.2 mole) of dry pyridine. The whole was then stirred at 35–40° C. for 8 hours. At the end of that time the ether was removed and the residue was stirred at 60–75° C. for about an hour. Upon cooling, water was added to dissolve the pyridine hydrochloride. After filtering and diluting the filtrate with ether, the organic phase which formed was washed with 100 ml. of 0.6 N hydrochloric acid to remove all of the pyridine and then with water. Drying of the washed product over magnesium sulfate and twice repeated distillation of the dried material gave the substantially pure tetrakis(1,1,2,2,3,3-hexahydroperfluorodecyl) silicate, B.P. 185° C./0.05 mm., $n_D^{25}$ 1.3292, $D_4^{25}$ 1.699, and analyzing as follows:

Calc'd for $C_{40}H_{24}F_{60}O_4Si$: percent C, 27.66; percent H, 1.39; percent F, 65.64. Found: percent C, 27.99; percent H, 1.49; percent F, 65.93.

The compound was found to have a pour point of minus 15° F. (supercooled), and a kinematic viscosity of 28.50 centistokes at 100° F. and 4.19 centistokes at 210° F. The autogenous ignition temperature of the compound was 900° F. for 0.15 ml. with 2 seconds lag. It had a flash point of 529° F. and a fire point of 716° F.

Instead of using a single silicate obtained as in the above examples, the operative fluid of the present hydraulic systems and methods may be a mixture of the presently provided, partialy fluorinated silicates. In some instances, it will be found that those fluorine-bearing compounds having more than 3 unsubstituted methylene radicals possess better fluidity than do the others. Also a maximum fluorine content without sacrifice of fluidity may be desirable and such compounds might not be as readily available as the less fluorinated esters. Mixing of several different esters may thus be employed to give an optimum of the desired properties. Preparation of such mixtures involves only routine procedures and is well within the skill of the art. The present silicates may also be mixed with known hydraulic fluids, e.g., the trialkyl phosphates or the dialkyl arylphosphonates, or with other fluids which are inert to the present compounds, so long as the properties of the resulting mixture meet the specifications required of a hydraulic fluid for the intended use. Obviously, if the contemplated use places no limitation on such factors as either low or high temperature behavior or moisture resistance or if no fire-hazard exists, the present compounds may be present in any proportion. However, if one or more of these factors are important, then care should be observed in preventing an undesired extent of dilution.

Also, the usual fluid additives, e.g., corrosion inhibitors, antioxidants, viscosity-index improvers, etc., may be added to the present silicates, although for most purposes it will be found that such additives can be dispensed with.

It is to be understood that although the invention has been described with specific reference to particular embodiments thereof, it is not to be limited since changes and alterations therein may be made which are within the full intended scope of this invention as defined by the appended claims.

What we claim is:

1. A compound of the formula $$Si[O(CH_2)_m(CF_2)_nCF_3]_4$$

wherein $m$ is a number of 3 to 11 and $n$ is a number of 0 to 6.

2. A tetrakis-(polyfluoroalkyl) orthosilicate having the formula

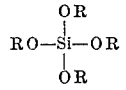

where R has the formula $CF_3(CF_2)_nCH_2CH_2CH_2$— where $n$ is an integer of from 0 to 4.

3. The compound defined in claim 1 further limited in that $m$ is 3.

4. A compound of the formula $$Si[OCH_2CH_2CH_2(CF_2)_6CF_3]_4$$

5. The compound having the formula $$[CF_3(CF_2)_2CH_2CH_2CH_2O]_4Si$$

References Cited

UNITED STATES PATENTS

| | | | |
|---|---|---|---|
| 2,698,836 | 1/1955 | Morrell | 260—448.8 X |
| 2,727,054 | 12/1955 | Wright | 260—448.8 |
| 2,993,925 | 7/1961 | Husted | 260—448.8 |
| 3,033,788 | 5/1962 | Trautman | 260—448.8 X |
| 3,085,104 | 4/1963 | Smith et al. | 260—448.8 |
| 3,114,760 | 12/1963 | McBee et al. | 260—448.8 |
| 3,223,642 | 12/1965 | Smith et al. | 260—448.8 X |
| 3,246,030 | 4/1966 | Seil et al. | 260—448.8 X |

OTHER REFERENCES

Froberger, J. Org. Chem., 25, February 1960, pp. 311–312.

TOBIAS E. LEVOW, Primary Examiner

P. F. SHAVER, Assistant Examiner

U.S. Cl. X.R.

252—78; 260—633